United States Patent
Moller et al.

(10) Patent No.: US 7,480,821 B2
(45) Date of Patent: Jan. 20, 2009

(54) METHOD FOR ENCODING/DECODING A BINARY SIGNAL STATE IN A FAULT TOLERANT ENVIRONMENT

(75) Inventors: Hanan Z. Moller, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 569 days.

(21) Appl. No.: 11/142,562

(22) Filed: May 31, 2005

(65) Prior Publication Data
US 2005/0223276 A1    Oct. 6, 2005

Related U.S. Application Data

(63) Continuation of application No. 10/026,353, filed on Dec. 21, 2001, now abandoned.

(51) Int. Cl.
     *G06F 11/00*     (2006.01)
(52) U.S. Cl. ....................................................... 714/10
(58) Field of Classification Search ...................... 714/2, 714/3, 6–8, 10, 13, 15
See application file for complete search history.

(56) References Cited

U.S. PATENT DOCUMENTS

| | | | |
|---|---|---|---|
| 3,920,975 A | | 11/1975 | Bass |
| 5,893,162 A | | 4/1999 | Lau et al. |
| 6,035,416 A | | 3/2000 | Abdelnour et al. |
| 6,215,998 B1 | | 4/2001 | Stovall et al. |
| 6,650,803 B1 | * | 11/2003 | Ramaswami et al. .......... 385/17 |
| 6,792,174 B1 | * | 9/2004 | Ramaswami ................. 385/17 |
| 6,836,353 B1 | * | 12/2004 | Ramadas et al. ............ 359/298 |
| 6,882,765 B1 | * | 4/2005 | Erickson et al. ............... 385/16 |
| 2005/0008284 A1 | * | 1/2005 | Chaudhuri et al. ............ 385/17 |

* cited by examiner

*Primary Examiner*—Nadeem Iqbal

(57) ABSTRACT

A method for use in a fault tolerant environment for assuring that devices within the environment switch between primary and back-up systems in response to remotely generated control signals. In one embodiment, the inventive system uses a binary code in the form of a pair of different frequency signals, i.e., a binary zero is represented by one frequency and a binary one is represented by another frequency. The signals may be continuous or may be sent in timed bursts. At the individual devices, which may comprise line cards, a receiver is provided to detect the presence of the signals.

3 Claims, 2 Drawing Sheets

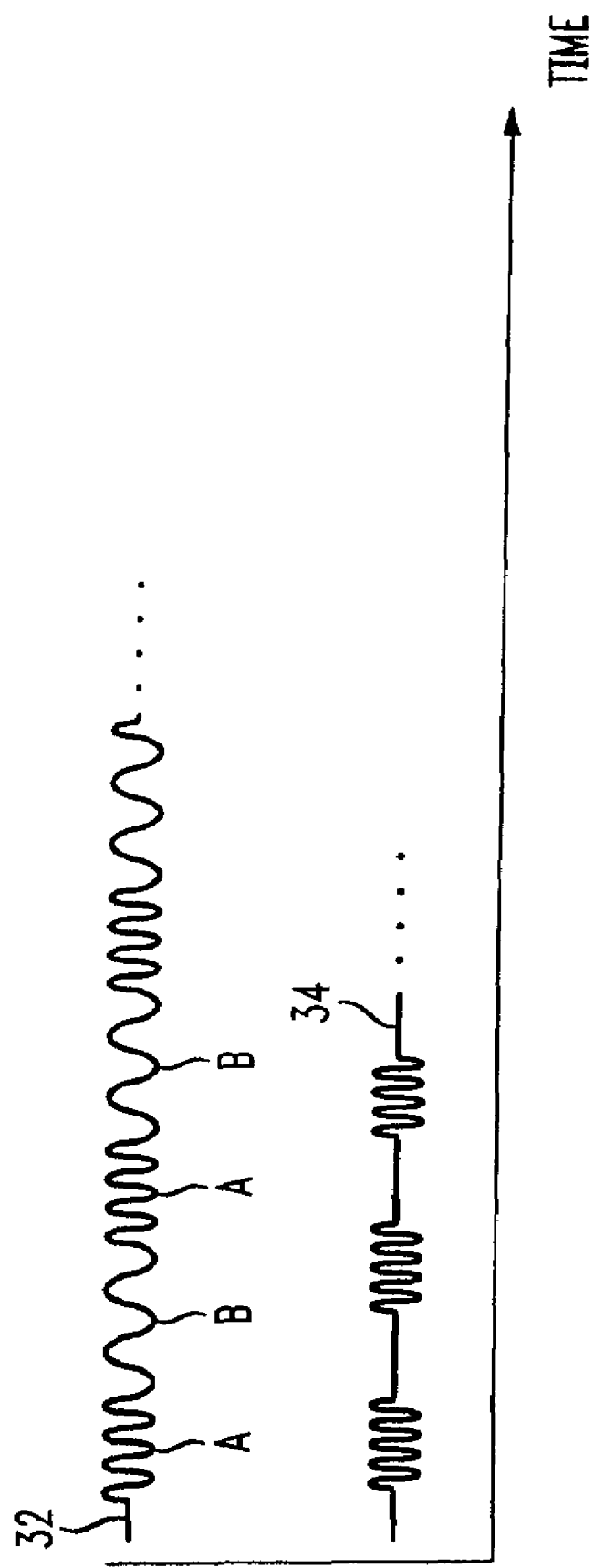

METHOD FOR ENCODING/DECODING A BINARY SIGNAL STATE IN A FAULT TOLERANT ENVIRONMENT

SPECIFIC DATA RELATED TO THE INVENTION

This application is a continuation of prior U.S. application Ser. No. 10/026,353, filed on Dec. 21, 2001 now abandoned.

BACKGROUND OF THE INVENTION

The present invention relates to fault tolerant systems and, more particularly, to a method for confirming validity of a control signal for energizing a back-up system in a fault tolerant environment.

Numerous electronic control systems utilize multiple redundant systems to assure fault tolerance in critical applications. One example of such a system is a redundant switching fabric for a communication line card installation. Typically, such systems have two switching fabrics, a primary and a back-up. All of the line cards are connected to the outside world through the switching fabric. In the event that the primary fabric has a failure, the system has to switch to the back-up fabric. In this example, the switching function resides on each line card and a remote controller provides a binary state signal to each card to let the card know when to switch to the back-up fabric.

One potential problem with such systems is that the control signal may become tied to one of the binary states and be unable to switch in response to the remote controller. For example, if a binary zero is used to maintain the line cards connected to the primary fabric and the control signal line becomes grounded, the line card will not receive a binary one signal generated by the controller when the binary one signal is used to command a change to the back-up fabric. Another potential problem is that the control signal could fail into the switch state and cause one or more of the components to switch in error. In particular, a subset of the components might see the switch indication. This is particularly undesirable since it could lead to a partitioning of the system and result in a system failure. This type failure is not amenable to the test mode described below. There are solutions to this problem as well, such as running dual redundant signals and then running tests on both of them but such additional redundancy introduces more complexity. One solution to this problem is to periodically run a test mode in which a test signal is sent to each line card and a check is then made to determine if the line card responded to the test signal. While this approach may be suitable in simple systems having only a few devices that need to switch, verifying that each line card in a typical communication system has switched presents a complex problem. Accordingly, it would be desirable to provide a method for continually verifying proper operation of devices in response to control signals in a fault tolerant environment.

SUMMARY OF THE INVENTION

The present invention is directed to a method for use in a fault tolerant environment for assuring that devices within the environment switch between primary and back-up systems in response to remotely generated control signals. In one embodiment, the inventive system uses a binary code in the form of a pair of different frequency signals, i.e., a binary zero is represented by one frequency and a binary one is represented by another frequency. The signals may be continuous or may be sent in timed bursts. At the individual devices, such as the aforementioned line cards, a receiver is provided to detect the presence of the signals. Since the line cards already have receivers to detect the binary signal, modification to detect a frequency signal requires the addition of minimal components. The receiver also includes circuitry for reporting the status of the card and such circuitry can be used to report to the remote controller whether the signals are reaching the line card. Alternately, the signals could be sent in burst format using a single frequency in which the number of bursts could indicate a binary one or a binary zero. For example, if N bursts are received in some unit of time, that could be indicative of one binary state. If 2N burst are received in the same unit of time, that could be indicative of another binary state. In another form, the receiver could be programmed to look for N changes of frequency per unit of time to indicate one binary state and 2N changes of frequency could be indicative of another binary state. In any of the examples, the receiver could be programmed to notify the remote controller whenever signals are being received and the absence of signal confirmation at the controller would be indicative of a loss of the control signal. In this way, the system would always know whether or not the control signal is being transmitted to the devices and thereby provide assurance that the redundancy is available.

BRIEF DESCRIPTION OF THE DRAWING

For a better understanding of the present invention reference may be had to the following detailed description taken in conjunction with the accompanying drawing in which:

FIG. 2 is a graph illustrating two forms of control signals.

DETAILED DESCRIPTION OF THE INVENTION

Figure 1:
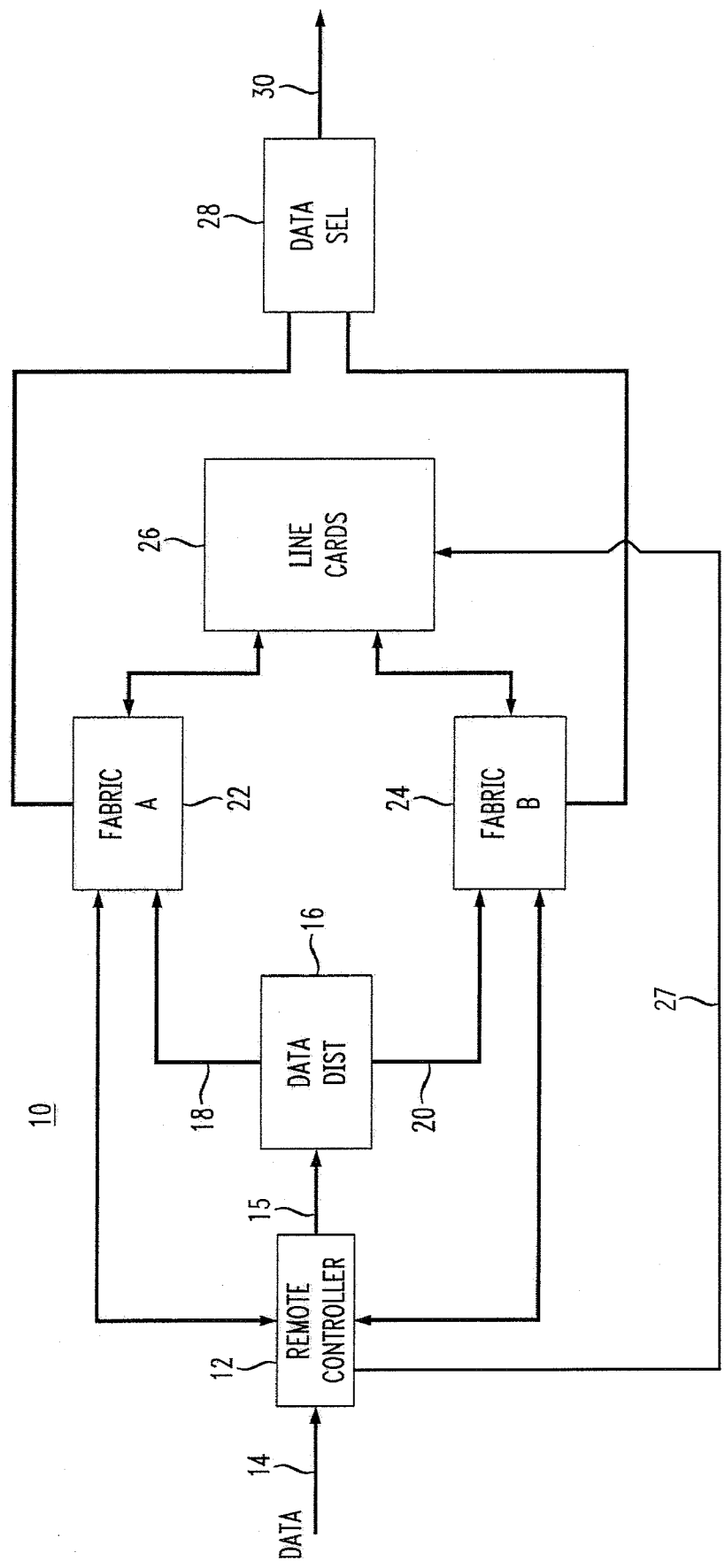
FIG. 1 is a simplified illustration of a phone switching system incorporating a redundant switching fabric with which the present invention may be used.

Referring to FIG. 1, there is illustrated a portion of a communication switching system 10 with which the present invention may be used. The system includes a block 12 identified as a remote controller which monitors and directs data flow into a distribution network. Data entering block 12 at line 14 is directed via line 15 into a data distribution block 16 which forwards the data into multiple selected paths, two of which are shown at 18 and 20 coupling the data into a pair of redundant switching fabrics 22 and 24. The switching fabrics couple data signals to and from a set of line cards 26. In the communication system, the line cards are arranged so that each card directs calls to a specific communication line. The switching fabric is essentially a back plane connecting the line cards to the communication lines. In existing systems, the remote controller monitors operation of the switching fabric and determines whether there is any failure in the fabric. In the event of a failure, the controller 12 provides a DC signal via line 27 to instruct the line cards to switch their respective inputs and outputs to the back-up fabric. Both the switching fabrics 22 and 24 are arranged to couple output data through a data select block 28. The block 28 functions to pass data from either fabric to an output bus 30.

In prior art systems, the controller 12 uses a bi-level control signal on a control voltage line to indicate to the line cards 26 which of the fabrics 22 and 24 are to be used to couple data into and out of the system. For example, a signal of zero volts would indicate use of one fabric and a signal of some positive or negative voltage would indicate use of the other of the fabrics. One problem with this system is that a grounded or open control voltage line corresponds to one state of the bi-level control signal. If the controller 12 changes the state of the control signal, the grounded or open control line will prevent the control signal from changing state at the line cards and thus prevent the redundant or back-up fabric from being brought into use, or alternately causing one or more of the line cards to switch states in error, leading to a partitioned system.

The present invention overcomes the above described problem with the control line signaling by changing the format of the control signal. The bi-level control signal is replaced with a signal that has a varying characteristic. By way of example, the control signal may be a dual frequency signal such that a first frequency of the signal indicates selection of a primary fabric (or other device) and a second frequency of the signal indicates selection of a back-up fabric (or other device). FIG. 2 at 32 shows a first frequency at A and a second frequency at B. As another example, the signal could be a multipulse signal in which a first number of pulses per unit of time would indicate selection of a first device and a second number of pulses per unit of time would indicate selection of a second device. FIG. 2 at 34 indicates one form of such pulsing. Other variations of this concept could be implemented with the basic theme of a variation in the control signal per unit time being such as to assure that a loss of control signal can be recognized. All of these signals are characterized by having a varying value rather than being set at some fixed value that could be duplicated by inadvertent coupling of the control line to some fixed value.

In the illustrative example, the line cards 26 could be modified to receive the varying signal and provide a response to the controller 12 confirming receipt of the signal. In one form, the control voltage line, such as the lines 32 and 34, could be bi-directional signal lines passing through the fabrics 22 and 24 to the respective line cards 26. Each line card could be modified to return a recognizable signal to the controller to indicate to the controller that the control voltage signal was received. Various types of signal responsive circuits are known in the art for performing this function. Further, while the control signal line is shown as a hard-wired line in the drawing, it will be understood that the return signal could be a wireless transmission.

While the invention has been described in what is presently considered to be a preferred embodiment, various modifications will become apparent to those skilled in the art. It is intended therefore that the invention not be limited to the specific disclosed embodiment but be interpreted within the full spirit and scope of the appended claims.

What is claimed is:

1. In a communication system having a primary switching fabric and a back-up switching fabric, a plurality of line cards connected to each switching fabric and adapted to select one switching fabric as a source of data, a method for assuring that the line cards receive commands to select an operating switching fabric comprising:

transmitting a time varying signal having a first predetermined frequency to the line cards so long as the primary switching fabric is operational;

detecting a failure in the primary switching fabric; and transmitting a time varying signal having a second predetermined frequency to the line cards in response to detecting a failure in the primary switching fabric whereby the line cards are enabled to receive data from the back up switching fabric in response to receiving the signal of the second predetermined frequency.

2. The method of claim 1 wherein the signal frequency is a continuous wave frequency.

3. The method of claim 1 wherein the signal frequency is a selected number of signals per unit of time.

* * * * *